United States Patent [19]

Börjesson

[11] Patent Number: 4,787,532

[45] Date of Patent: Nov. 29, 1988

[54] TRANSPORT-AND STORAGE CONTAINER FOR COOLED GOODS

[75] Inventor: Ove Börjesson, Varberg, Sweden

[73] Assignee: Bilspedition AB, Sweden

[21] Appl. No.: 102,571

[22] Filed: Sep. 29, 1987

[51] Int. Cl.[4] .............................................. A23G 9/00
[52] U.S. Cl. ................................. 220/410; 220/1.5; 220/21; 62/457; 62/459; 62/464
[58] Field of Search ................ 220/410, 408, 1.5, 1 C, 220/3.1, 21, 470; 206/443, 562; 62/317, 464, 465, 457, 559

[56] References Cited

U.S. PATENT DOCUMENTS

| Re. 17,279 | 4/1929 | Copeman | 206/562 X |
|---|---|---|---|
| 1,896,756 | 2/1933 | Spalding | 62/459 X |
| 3,463,378 | 8/1969 | Van Daalen | 220/410 |
| 3,516,596 | 6/1970 | Madden et al. | 220/410 X |
| 3,788,002 | 1/1974 | Suchka | 220/21 X |
| 4,565,074 | 1/1986 | Morgan | 62/464 X |
| 4,648,524 | 3/1987 | Ackermann | 220/21 X |
| 4,688,398 | 8/1987 | Baek | 62/457 X |

Primary Examiner—Steven M. Pollard
Attorney, Agent, or Firm—Cushman, Darby & Cushman

[57] ABSTRACT

Transport- and storage container for cooled goods, for example fresh fish, using ice as cooling medium and comprising a first container of an impact-resisting and heat insulating material, and a second self-supporting container shaped so that it can be received as an insert in the first container. The second container is of a water-proof material and has in its bottom distance members for keeping the cooled goods separated from the water from the melted ice. The distance members consist of a number of vertical cells forming a lattice work upon which the cooled goods is intended to rest and which cells communicate with each other through overflows.

1 Claim, 1 Drawing Sheet

TRANSPORT-AND STORAGE CONTAINER FOR COOLED GOODS

The present invention relates to a transport- and storage container for cooled goods, especially fresh fish, using ice as cooling medium, which is packed together with the cooled goods and when melted is admitted to flow down about said goods.

BACKGROUND OF THE INVENTION

Fresh fish is to be transported long distances, for exampel by air, retaining a constant low temperature of approximately +2° C. The fish is usually packed in boxes of insulating material, which are placed inside a cover of kraft liner board. As cooling medium ice is used, which gradually melts, whereby the water from the melted ice runs around the fish and cools the same.

Great demands are put on similar packings concerning density, especially if the fish should be transported together with other types of goods in connection with air transportations, where absolutely no leakage is permitted.

SUMMARY OF THE INVENTION

The purpose of the present invention is to provide a transport- and storage container of the above mentioned type, which meets high demands on insulation as well as on density. Thus the container should not emit any water and after it has been sealed it should be so tight that no smell from for example the fish should be felt. It shold have low weight and good insulation qualities so that the desired temperature level can be kept at least a couple of days. This is according to the invention achieved by the fact that it comprises an outer container of an impact resisting and heat insulating material, a self-supporting inner container of a water-proof material shaped so that it can be received as an insert in the outer container covering the bottom and inner side walls thereof, at which the insert is liftable out of the outer continer and usable separately e.g. when storing the goods in cold stores, at sales exposure etc., a lattice work arranged in the bottom of the water-proof inner container for distancing the cooled goods from the melted ice, said lattice work comprising a plurality of closed, upwards open cells communicating with each other through overflows, a cover provided with a downwardly projecting edge intended to engage into a recess in the upper edge of the outer container, at which the inner container at the top is provided with an outwardly projecting, circumferential flange arranged to rest on the upper edge of the outer container and sealingly connect on to the same by means of the cover.

DESCRIPTION OF THE DRAWINGS

The invention will in the following be closer describe with reference to an embodiment shown in the enclosed drawings.

DESCRIPTION OF AN EMBODIMENT

Figure 1:
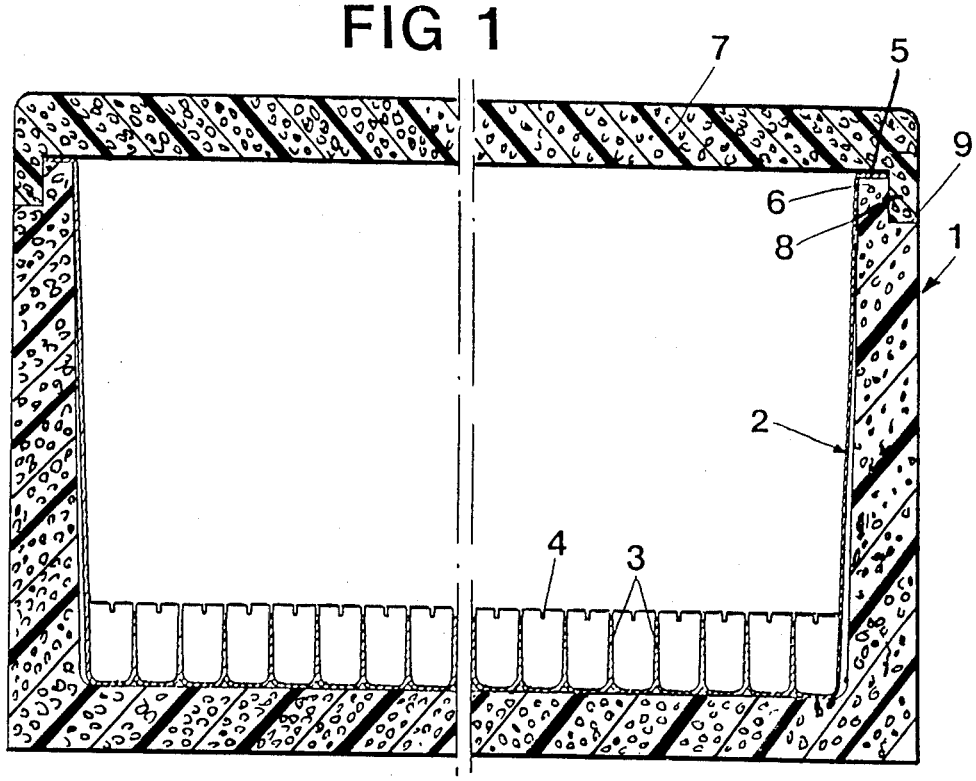
FIG. 1 shows a vertical section through the container.
Figure 2:
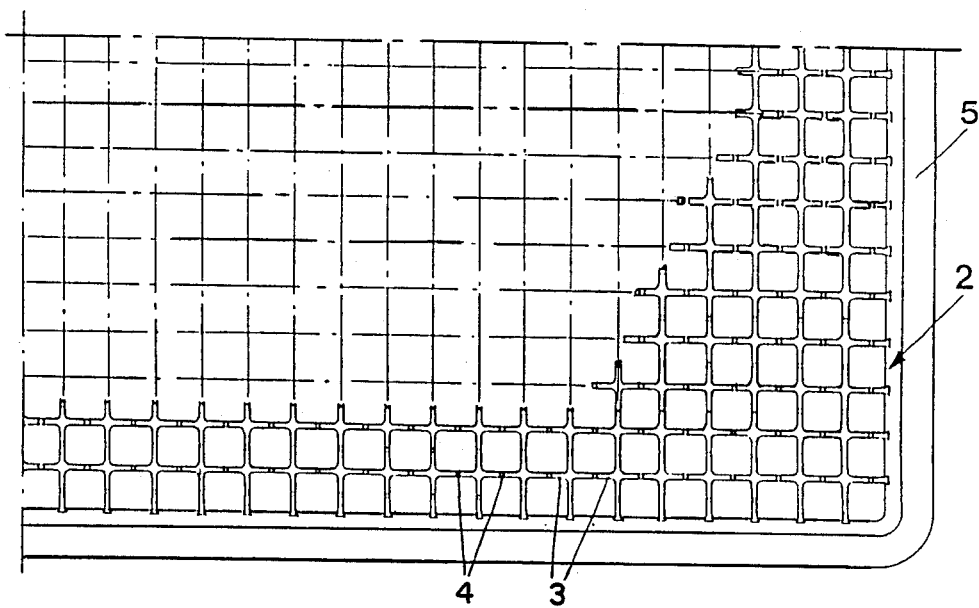
FIG. 2 shows a part of the container from above.

The package consists of two parts matching into each other, one outer box 1 of a heat insulating material such as hard foamed plastic, for exampel Frigolit, and an inner box 2 of a water-proof material, for example injection-moulded polyethylene. The inner box 2 is shaped to be received as an insert in the outer box 1. The bottom of the inner box 2 is shaped so that the water from the ice which cools the fish is gathered in a number of vertical cells 3 forming a lattice work in the bottom of the box 3. The cells 3 comunicate with each other through overflows 4. The lattice works forms a lattice on which the fish rests and is keept separated from the melted ice.

The inner box 2 has at the top an outwards projecting edge 5, which rests against the upper edge 6 of the outer box 1. The outer box 1 is provided with a cover 7, which with a rim 8 engages a recess 9 in the upper edge 6 of the outer box 1 and provided a tight connection of the inner box 2 against the outer box 1.

The inner box 2 is slightly tapering towards its bottom and can easily be released from the outer box 1 and be used separately, both at sales exposure, handling of frozen goods and of the fish onboard on fishing boats. It is pileable so it requires little space when empty.

The field of application for the packing is of course not limited to fish handling, but can with advantage be used for other cooled goods, such as cooling boxes for leisure boats etc. The invention is not limited to the shown embodiment but a number of different variations are possible within the scope of the claims.

What is claimed is:

1. A transport- and storage unit for cooled goods, especially fresh fish, using ice as cooling medium, which is packed together with the cooled goods and when melted is admitted to flow down about said goods, and which comprises an outer container of an impact resisting and heat insulating material, a self-supporting inner container of a water-proof material shaped so that it can be received as an insert in the outer container covering the bottom and inner side walls thereof, at which the insert is liftable out of the outer continer and usable separately e.g. when storing the goods in cold stores, at sales exposure etc., a lattice work arranged in the bottom of the water-proof inner container for distancing the cooled goods from the melted ice, said lattice work comprising a plurality of closed, upwards open cells communicating with each other through overflows, a cover provided with downwardly projecting edge intended to engage into a recess in the upper edge of the outer container, at which the inner container at the top is provided with an outwardly projecting, circumferential flange arranged to rest on the upper edge of the outer container and sealingly connect on to the same by means of the cover.

* * * * *